(12) United States Patent
Lou et al.

(10) Patent No.: US 11,894,778 B2
(45) Date of Patent: Feb. 6, 2024

(54) HIGH CURRENT DC-DC CONVERTER WITH INTEGRATED MATRIX TRANSFORMER AND MULTIPHASE CURRENT DOUBLER RECTIFIER

(71) Applicant: VIRGINIA TECH INTELLECTUAL PROPERTIES, INC., Blacksburg, VA (US)

(72) Inventors: Xin Lou, Blacksburg, VA (US); Qiang Li, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 353 days.

(21) Appl. No.: 17/511,753

(22) Filed: Oct. 27, 2021

(65) Prior Publication Data
US 2022/0385198 A1 Dec. 1, 2022

Related U.S. Application Data

(60) Provisional application No. 63/194,253, filed on May 28, 2021.

(51) Int. Cl.
*H02M 3/335* (2006.01)

(52) U.S. Cl.
CPC ................. *H02M 3/33592* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219;
(Continued)

(56) References Cited

U.S. PATENT DOCUMENTS 5,784,266 A 7/1998 Chen
5,933,338 A 8/1999 Wallace
(Continued)

OTHER PUBLICATIONS

Saggini et al. "An Isolated Quasi-Resonant Multiphase Single-Stage Topology for 48-V VRM Applications"; IEEE Transactions on Power Electronics, vol. 33, No. 7, Jul. 2018.
(Continued)

*Primary Examiner* — Jeffrey A Gblende
(74) *Attorney, Agent, or Firm* — Thomas Horstemeyer, LLP

(57) ABSTRACT

Aspects of direct current (DC)-DC converters with an integrated matrix transformer and multiphase current doubler rectifiers are described. In some examples, a DC-DC converter can include a matrix transformer that has multiple magnetically integrated transformer components that are magnetically integrated using transformer components that share a top plate and a bottom plate. A multiphase current doubler rectifier can include multiple synchronous rectifiers corresponding to the plurality of transformer components of the matrix transformer.

20 Claims, 7 Drawing Sheets

(58) Field of Classification Search
CPC ............. H02M 7/4815; H02M 1/0048; H02M 7/4818; H02M 7/4826; Y02B 70/1491
See application file for complete search history.

(56) References Cited

U.S. PATENT DOCUMENTS

| | | | |
|---|---|---|---|
| 6,198,644 B1 * | 3/2001 | Minamisawa | ........ H02M 3/337 363/44 |
| 6,784,644 B2 | 8/2004 | Xu et al. | |
| 10,910,140 B2 * | 2/2021 | Fei | ...................... H02M 3/3376 |
| 11,021,069 B1 * | 6/2021 | Elshaer | ................... B60L 50/60 |
| 11,062,836 B2 * | 7/2021 | Chen | ......................... H01F 3/10 |

OTHER PUBLICATIONS

Xu et al. "A Novel Integrated Current Doubler Rectifier"; IEEExplore provided by University Libraries, Virginia Tech. Downloaded on Jan. 25, 2021 at 19:58:37 UTC from IEEE Xplore.

Xu et al. "Design of 48 V Voltage Regulator Modules With a Novel Integrated Magnetics"; IEEE Transactions on Power Electronics, vol. 17, No. 6, Nov. 2002.

Chen et al. "Design of High Efficiency, Low Profile, Low Voltage Converter With Integrated Magnetics"; IEEExplore provided by University Libraries, Virginia Tech. Downloaded on Jan. 25, 2021 at 21:16:07 UTC from IEEE Xplore.

* cited by examiner

HIGH CURRENT DC-DC CONVERTER WITH INTEGRATED MATRIX TRANSFORMER AND MULTIPHASE CURRENT DOUBLER RECTIFIER

CROSS-REFERENCE TO RELATED APPLICATIONS

This Application claims priority to, and the benefit of, U.S. Provisional Application No. 63/194,253, filed on May 28, 2021, and entitled "Magnetic Integration of Multiple Current Doubler Rectifying Circuit," which is hereby incorporated herein by reference in its entirety.

BACKGROUND

Efficient power management solutions for data centers and telecom applications on both system and converter level are gaining more attention due to the rapid increase of power consumption for these loads. To reduce bus distribution losses, cost, and size, a 48V bus voltage can be used to replace the conventional 12V bus approach. However, this approach gives rise to a significant challenge for voltage regulator module (VRM) designs being placed near the CPU, because VRMs typically operate with a very high efficiency and high power density. Some solutions for the 48V bus approach include two-stage solutions. The first stage is either an LLC resonant converter or a switched tank converter, which is unregulated, and the second stage is a multi-phase buck converter.

To further improve the light load efficiency and reduce device numbers, a single stage solution is desirable. A phase-shifted full-bridge converter with a current doubler rectifier can be utilized. In order to achieve soft switching, a quasi-resonant constant on-time operation can be adopted. With the current doubler rectifier, the topology integrates the multiphase approach, providing fast phase shedding and flat high-efficiency curves even at light load conditions. However, the disadvantage of the current doubler circuit is the use of costly inductors. A power circuit for this topology can employ three magnetic components, one for the transformer and two for the inductors. This increases the cost of the system, causing termination power loss and reducing power density.

An integrated magnetics topology for the current doubler rectifier can also be used. The topology can include a primary winding in the center leg and two secondary windings in the outer legs. The magnetizing inductors on the secondary side can be utilized as the inductors of the current doubler rectifier, and the three magnetic components can be integrated into an EI or EE core. However, the circuit can suffer from a large leakage inductance problem because the primary and secondary windings are placed at the different core legs. Existing technologies can also include one current doubler rectifier connected to one primary side circuit (full bridge or half bridge). This limits the power density. Accordingly, further development is needed for direct current (DC)-DC converters and power management systems.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to high current direct current (DC)-DC converters with integrated matrix transformer components and multiphase current doubler rectifiers. The described converters can include a multiple current doubler rectifying circuit and magnetic integration of the circuit using core designs. A rectifying circuit can include multiple current doubler rectifiers. On the output side the circuit can be connected in parallel. From the input side, the connections can be either in parallel or in series.

An integrated magnetics topology can include a primary winding that is split and placed at the outer legs, which can be referred to as winding legs. Both the primary and secondary windings can be wound on the same legs. This can achieve tight coupling. An interleaving winding technique can be used to minimize the leakage inductance, thus improving efficiency. In addition, the two primary windings can be negatively coupled, which can reduce core loss in the center leg and can create non-linear inductors.

Figure 1:
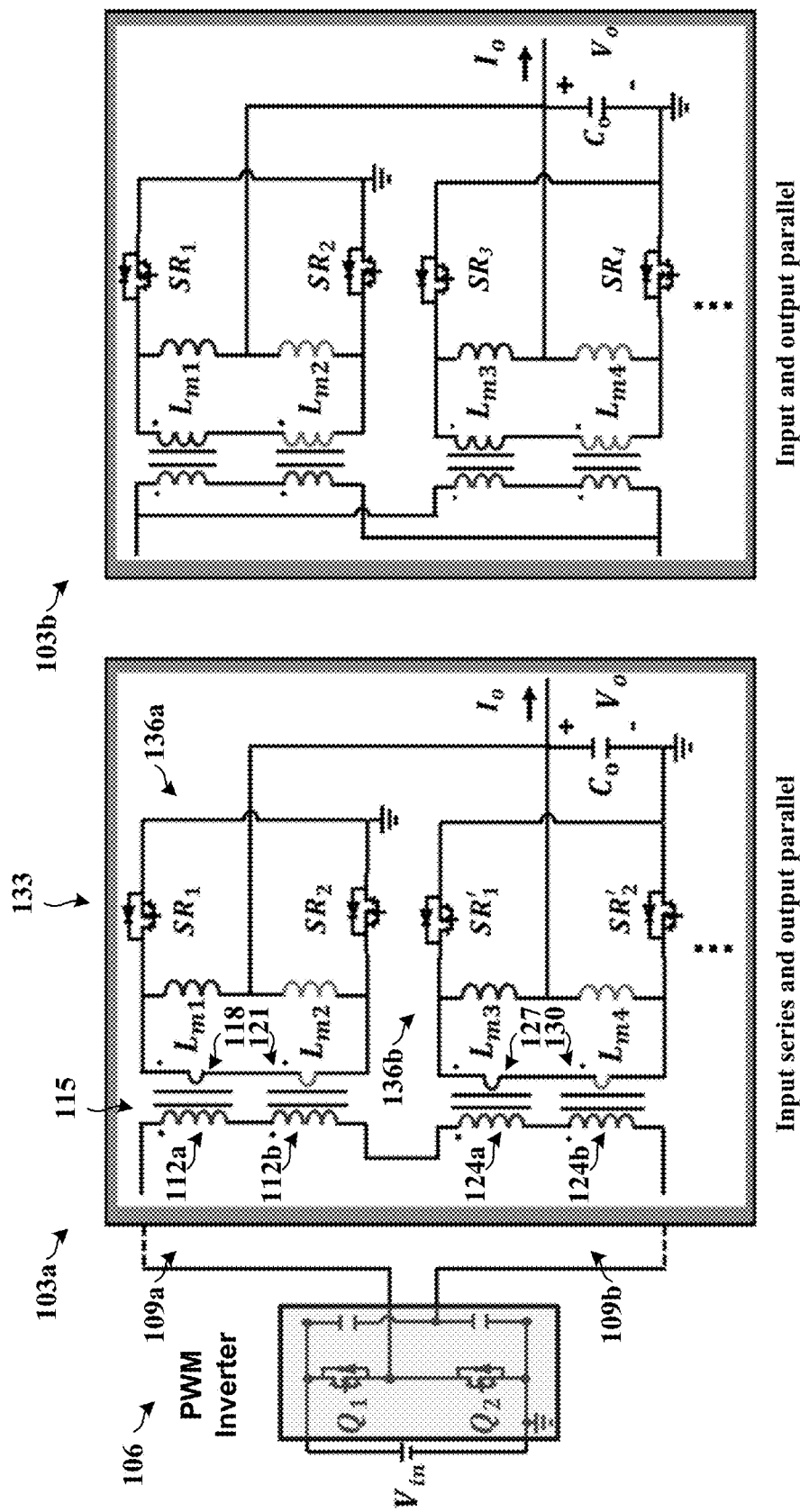
FIG. 1 illustrates example circuit diagrams for a direct current (DC)-DC converter with integrated matrix transformer and multiphase current doubler rectifier, according to embodiments of the present disclosure.

FIG. 1 shows a DC-DC converter 103a and a DC-DC converter 103b, where each is a DC-DC converter 103. Each of the DC-DC converter 103a and the DC-DC converter 103b can include an integrated matrix transformer and multiphase current doubler rectifier. Each of the DC-DC converter 103a and the DC-DC converter 103b can include a pulse width modulation (PWM) inverter 106 or another inverter circuit. DC-DC converter 103a shows an example where the modulated voltage from the PWM inverter 106 is connected in series across the primary winding 109a and the primary winding 109b. The primary winding 109a can be a split primary winding, since the primary winding 109a is split into a partial primary winding 112a and a partial primary winding 112b. The partial primary winding 112a can be wound on a first winding leg of a matrix transformer 115, while the partial primary winding 112b can be wound on a second winding leg of the matrix transformer 115. Magnetizing inductance can be utilized to build integrated output inductors $L_{m1}$, $L_{m2}$, $L_{m3}$, $L_{m4}$. Each of the output inductors $L_{m1}$, $L_{m2}$, $L_{m3}$, $L_{m4}$ can be integrated magnetic circuit inductors corresponding to one of the secondary windings 118, 121, 127, and 130.

The partial primary winding 112a can be wound on the first winding leg along with the secondary winding 118. The partial primary winding 112a can be wound on the first winding leg separately from or interleaved with the secondary winding 118. The winding leg can lack, or in other cases include, a gap in an EI or EE core topology for the matrix transformer 115, in the various embodiments.

The partial primary winding 112b can be wound on the second winding leg along with the secondary winding 121. The partial primary winding 112b can be wound on the second winding leg separately from or interleaved with the secondary winding 121. The winding leg can lack, or in other cases include, a gap in an EI or EE core topology for the matrix transformer 115, in the various embodiments.

The primary winding 109b can be a split primary winding, since the primary winding 109b is split into a partial primary winding 124a and a partial primary winding 124b. The partial primary winding 124a can be wound on a third winding leg of the matrix transformer 115, while the partial primary winding 124b can be wound on a fourth winding leg of the matrix transformer 115.

The partial primary winding 124a can be wound on the first winding leg along with the secondary winding 127. The partial primary winding 124a can be wound on the first winding leg separately from or interleaved with the secondary winding 127. The winding leg can lack, or in other cases include, a gap in an EI or EE core topology for the matrix transformer 115, in the various embodiments.

The partial primary winding 124b can be wound on the second winding leg along with the secondary winding 130. The partial primary winding 124b can be wound on the second winding leg separately from or interleaved with the secondary winding 130. The winding leg can lack, or in other cases include, a gap in an EI or EE core topology for the matrix transformer 115, in the various embodiments.

A controller or other circuit component can generate switching control signals for the switches $SR_1$ and $SR_2$ of a first synchronous rectifier for a first transformer component, and $SR_3$, and $SR_4$ of a second synchronous rectifier for a second transformer component. The controller can control $SR_1$, $SR_2$, $SR_3$, and $SR_4$ to operate as a multiphase current doubler rectifier 133. The switching control signals and switching for $SR_1$ and $SR_3$ can be synchronized or in phase with one another. The switching control signals and switching for $SR_2$ and $SR_4$ can be synchronized or in phase with one another. This topology and switching control scheme can cause negative coupling between integrated inductors $L_{m1}$, $L_{m2}$, $L_{m3}$, and $L_{m4}$ corresponding to alternately controlled switches and phases of the multiphase current doubler rectifier 133, which can increase steady state inductance while also reducing transient inductance.

For example, negative coupling can occur between integrated inductors $L_{m1}$, $L_{m2}$, $L_{m3}$, and $L_{m4}$. Flux cancellation can occur between the first winding leg and the second winding leg, the first winding leg and the fourth winding leg, the second winding leg and the third winding leg, and the third winding leg and the fourth winding leg. There can also be additional phases, and/or additional transformer primaries with resulting coupling as can be understood. Output voltage $V_o$ can be smoothed using an output capacitor $C_o$, as well as other techniques.

Primary winding 109a can correspond to a first transformer and primary winding 109b can correspond to a second transformer of the DC-DC converter 103a. The integration of multiple transformer components corresponding to multiple primary windings 109a, 109b and so on, can provide increased current. The multiphase current doubler rectifier 133 with two current doubler rectifiers 136a and 136b corresponding to the first transformer and the second transformer can cause the DC-DC converter 103a to work like a four-phase buck converter.

For each transformer component, the turns ratio between primary and secondary side can be N. In the example of the circuit topology or structure of the DC-DC converter 103a, the total turns ratio can be nN, where n is the number of current doubler rectifiers 136. As a result, the structure of the DC-DC converter 103a can be suitable for high turns ratio applications. For example, a 48V-1V single stage VRM solution for datacenter and telecom applications.

The DC-DC converter 103b can operate in a similar manner as the DC-DC converter 103a, except that the modulated voltage is connected to the primaries in parallel. The DC-DC converter 103b can also include a PWM inverter 106, multiple split primary transformer components, and multiple current doubler rectifiers of a multiphase current doubler rectifier. For the structure of the DC-DC converter 103b, the total turns ratio can be N because of the parallel primaries. For both structures of the DC-DC converters 103a and 103b, the total output current ability is extended compared to topologies with a single current doubler rectifier.

Figure 2A:
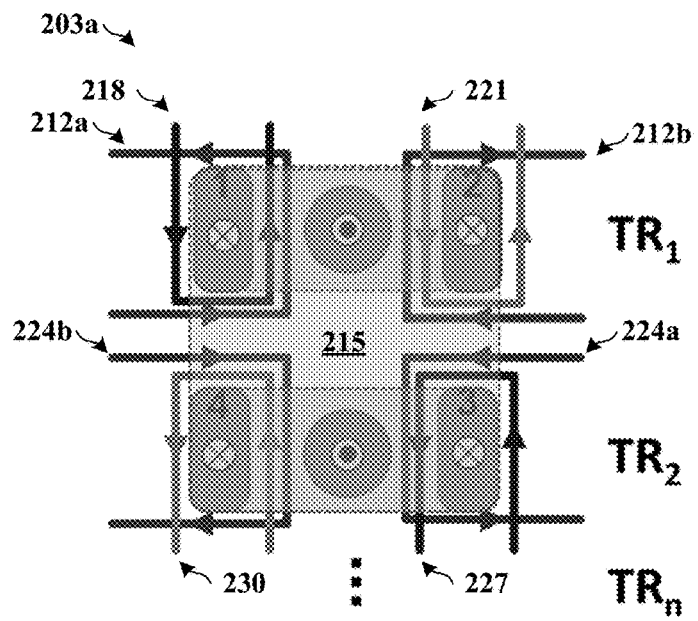
FIGS. 2A and 2B illustrate example core topologies for a DC-DC converter with integrated matrix transformer and multiphase current doubler rectifier, according to embodiments of the present disclosure.

FIG. 2A shows an example core topology 203a for a DC-DC converter 103 with an integrated matrix transformer and multiphase current doubler rectifier. This figure shows an example of an integration of multiple transformer components into a single merged or integrated matrix transformer core. The example core topology 203a merges one or more of the top and bottom plates of a magnetic core of a DC-DC converter with integrated matrix transformer and multiphase current doubler rectifier. The core topology 203a can be used along with a DC-DC converter 103. As indicated for the DC-DC converters 103a and 103b in FIG. 1, the core topology can include any number of transformer components, and each can use an EE or EI shape from a side view.

The core topology 203a can include transformer components $TR_1$, $TR_2$, $TR_n$. The transformer $TR_1$ can include a split primary winding that includes the partial primary winding 212a and partial primary winding 212b. The partial primary winding 212a can be wound on a winding leg 1 of a matrix transformer core 215, while the partial primary winding 212b can be wound on a winding leg 2 of the matrix transformer core 215. The winding direction of the partial primary winding 212a can be opposite from that of the partial primary winding 212b.

The DC-DC converter 103 that uses the matrix transformer core 215 can include a multiphase current doubler rectifier 133 that includes multiple current doubler rectifiers 136 and multiple transformer components $TR_1$, $TR_2$, $TR_n$. As a result, the matrix transformer core 215 can include a merged top plate and a merged bottom plate that is merged to enable coupling between the integrated output inductors corresponding to the secondary windings 218, 221, 227, 230. The outer winding legs can lack or include a gap, while the center flux path leg for each transformer component can include an air gap. The air gap in the center flux path leg can introduce or enable negative coupling between the output inductors.

The partial primary winding 212a can be wound on the same winding leg along with a secondary winding 218. The partial primary winding 212a can be wound on the first winding leg separately from or interleaved with the secondary winding 218.

The partial primary winding 212b can be wound on the second winding leg along with the secondary winding 221. The partial primary winding 212b can be wound on the second winding leg separately from or interleaved with the secondary winding 221. The winding legs can lack, or in other cases include, a gap in an EI or EE core topology for the matrix transformer core 215, in the various embodiments.

The transformer $TR_2$ can include a split primary winding that includes the partial primary winding 224a and partial primary winding 224b. The partial primary winding 224a can be wound on a winding leg 3 of a matrix transformer core 215, while the partial primary winding 212b can be wound on a winding leg 4 of the matrix transformer core 215. The winding direction of the partial primary winding 224a can be the same as that of the partial primary winding 212a and opposite from that of the partial primary winding 224b.

The partial primary winding 224a can be wound on the same winding leg along with a secondary winding 227. The partial primary winding 224a can be wound on the first winding leg separately from or interleaved with the secondary winding 227. The partial primary winding 224b can be wound on the second winding leg along with the secondary winding 230. The partial primary winding 224b can be wound on the second winding leg separately from or interleaved with the secondary winding 230. The winding legs can lack, or in other cases include, a gap in an EI or EE core topology for the matrix transformer core 215, in the various embodiments.

The indication of flux direction is provided for illustrative purposes of the flux path. The indication of flux direction uses x symbols to indicate a flux direction 'into the page' and dot symbols to indicate flux direction 'out the page.' Since the current in the transformer windings is an AC modulated current, the flux direction can depend on a direction of the current flow at a particular moment. The indication of flux direction is provided to show that when flux in a particular winding leg or outer leg is 'into the page,' then the corresponding resultant flux direction in the flux path leg or center leg is 'out of the page.'

Figure 2B:
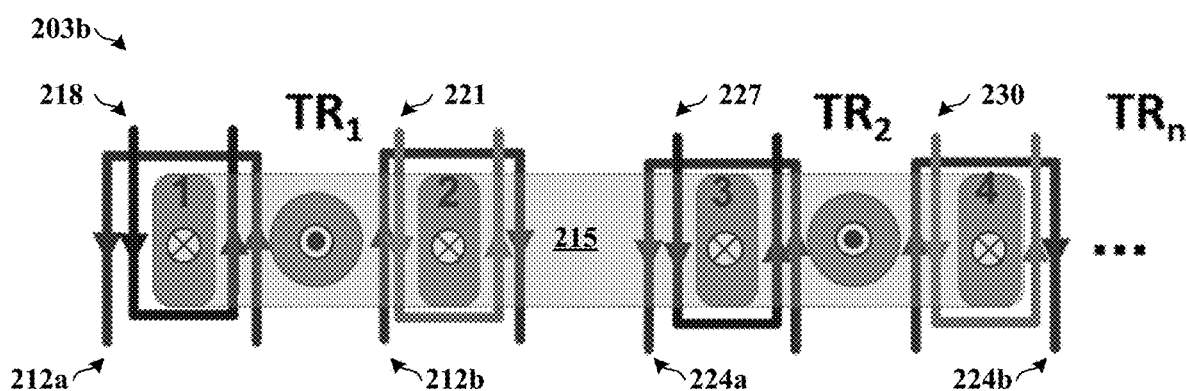

FIG. 2B shows an example core topology 203b for a DC-DC converter 103. This figure shows an example of an integration of multiple transformer components into a single merged matrix transformer core. The core topology 203b merges one or more of the top and bottom plates of a magnetic core of a DC-DC converter with integrated matrix transformer and multiphase current doubler rectifier. The core topology 203b can be used along with a DC-DC converter 103. As indicated for the DC-DC converters 103a and 103b in FIG. 1, the core topology can include any number of transformer components, and each can use an EE or EI shape from a side view.

By contrast with the core topology 203a, the core topology 203b can have all of the winding legs for all of the transformer components aligned. In this example, all of the center flux path legs are also aligned with the winding legs. However, in other examples corner flux path legs can be included. While the core shape and arrangement is different from the core topology 203a, the components can be similar.

The core topology 203b can also include transformer components $TR_1$, $TR_2$, $TR_n$. The transformer $TR_1$ can include a split primary winding that includes the partial primary winding 212a and partial primary winding 212b. The partial primary winding 212a can be wound on a winding leg 1 of a matrix transformer core 215, while the partial primary winding 212b can be wound on a winding leg 2 of the matrix transformer core 215. The winding direction of the partial primary winding 212a can be opposite from that of the partial primary winding 212b.

The DC-DC converter 103 that uses the matrix transformer core 215 can include a multiphase current doubler rectifier 133 that includes multiple current doubler rectifiers 136 and multiple transformer components $TR_1$, $TR_2$, $TR_n$. As a result, the matrix transformer core 215 can include a merged top plate and a merged bottom plate that is merged to enable coupling between the integrated output inductors corresponding to the secondary windings 218, 221, 227, 230. The winding legs can lack or include a gap, while the center flux path leg for each transformer component can include an air gap. The air gap in the center flux path leg can introduce or enable negative coupling between the output inductors.

The partial primary winding 212a can be wound on the same winding leg along with a secondary winding 218. The partial primary winding 212a can be wound on the first winding leg separately from or interleaved with the secondary winding 218.

The partial primary winding 212b can be wound on the second winding leg along with the secondary winding 221. The partial primary winding 212b can be wound on the second winding leg separately from or interleaved with the secondary winding 221. The winding leg can lack, or in other cases include, a gap in an EI or EE core topology for the matrix transformer core 215, in the various embodiments.

The transformer $TR_2$ can include a split primary winding that includes the partial primary winding 224a and partial primary winding 224b. The partial primary winding 224a can be wound on a winding leg 3 of a matrix transformer core 215, while the partial primary winding 212b can be wound on a winding leg 4 of the matrix transformer core 215. The winding direction of the partial primary winding 224a can be the same as that of the partial primary winding 212a and opposite from that of the partial primary winding 224b.

The partial primary winding 224a can be wound on the same winding leg along with a secondary winding 227. The partial primary winding 224a can be wound on the first winding leg separately from or interleaved with the secondary winding 227. The partial primary winding 224b can be wound on the second winding leg along with the secondary winding 230. The partial primary winding 224b can be wound on the second winding leg separately from or interleaved with the secondary winding 230. The winding legs can lack, or in other cases include, a gap in an EI or EE core topology for the matrix transformer core 215, in the various embodiments.

Figure 3:
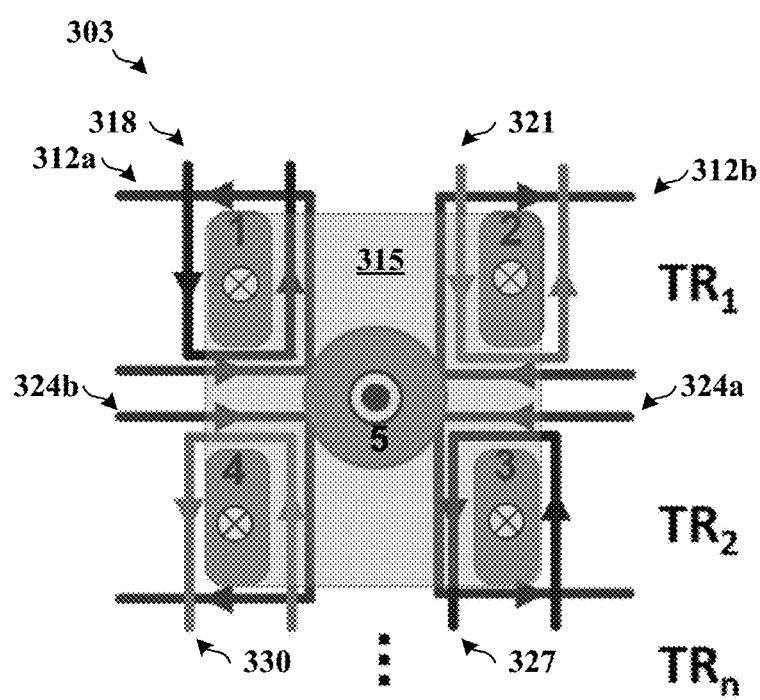
FIG. 3 illustrates another example core topology for a DC-DC converter with integrated matrix transformer and multiphase current doubler rectifier, according to embodiments of the present disclosure.

FIG. 3 shows a core topology 303 for a DC-DC converter 103. This figure shows that in addition to the merging multiple transformer components into an integrated matrix transformer core, the core topology 303 can merge the center flux path legs into a single center flux path leg 5 shared among multiple transformer components. The shared center flux path leg 5 can simplify construction, reduce total core footprint area, and provide more space for windings, and reduce winding loss among the various embodiments.

The core topology 303 can be used along with a DC-DC converter 103. As indicated for the DC-DC converters 103a and 103*b* in FIG. 1, the core topology can include any number of transformer components. Since the core topology 303 includes a merged or shared center flux path, this is a unique shape such that the EI or EE shape is not used for each transformer component.

The core topology 303 can include transformer components $TR_1$, $TR_2$, $TR_n$. The transformer $TR_1$ can include a split primary winding that includes the partial primary winding 312*a* and partial primary winding 312*b*. The partial primary winding 312*a* can be wound on a winding leg 1 of a matrix transformer core 315, while the partial primary winding 312*b* can be wound on a winding leg 2 of the matrix transformer core 315. The winding direction of the partial primary winding 312*a* can be opposite from that of the partial primary winding 312*b*.

The DC-DC converter 103 that uses the matrix transformer core 315 can include a multiphase current doubler rectifier 133 that includes multiple current doubler rectifiers 136 and multiple transformer components $TR_1$, $TR_2$, $TR_n$. As a result, the matrix transformer core 315 can include a merged top plate and a merged bottom plate that is merged to enable coupling between the integrated output inductors corresponding to the secondary windings 318, 321, 327, 330. The winding legs can lack or include a gap, while the shared center flux path leg 5 can include an air gap. The air gap in the center flux path leg 5 can introduce or enable negative coupling between the output inductors.

The partial primary winding 312*a* can be wound on the same winding leg along with a secondary winding 318. The partial primary winding 312*a* can be wound on the first winding leg separately from or interleaved with the secondary winding 318.

The partial primary winding 312*b* can be wound on the second winding leg along with the secondary winding 321. The partial primary winding 312*b* can be wound on the second winding leg separately from or interleaved with the secondary winding 321. The winding leg can lack, or in other cases include, a gap in an EI or EE core topology for the matrix transformer core 315, in the various embodiments.

The transformer $TR_2$ can include a split primary winding that includes the partial primary winding 324*a* and partial primary winding 324*b*. The partial primary winding 324*a* can be wound on a winding leg 3 of a matrix transformer core 315, while the partial primary winding 312*b* can be wound on a winding leg 4 of the matrix transformer core 315. The winding direction of the partial primary winding 324*a* can be the same as that of the partial primary winding 312*a* and opposite from that of the partial primary winding 324*b*.

The partial primary winding 324*a* can be wound on the same winding leg along with a secondary winding 327. The partial primary winding 324*a* can be wound on the first winding leg separately from or interleaved with the secondary winding 327. The partial primary winding 324*b* can be wound on the second winding leg along with the secondary winding 330. The partial primary winding 324*b* can be wound on the second winding leg separately from or interleaved with the secondary winding 330. The winding legs can lack, or in other cases include, a gap in an EI or EE core topology for the matrix transformer core 315, in the various embodiments.

Figure 4:
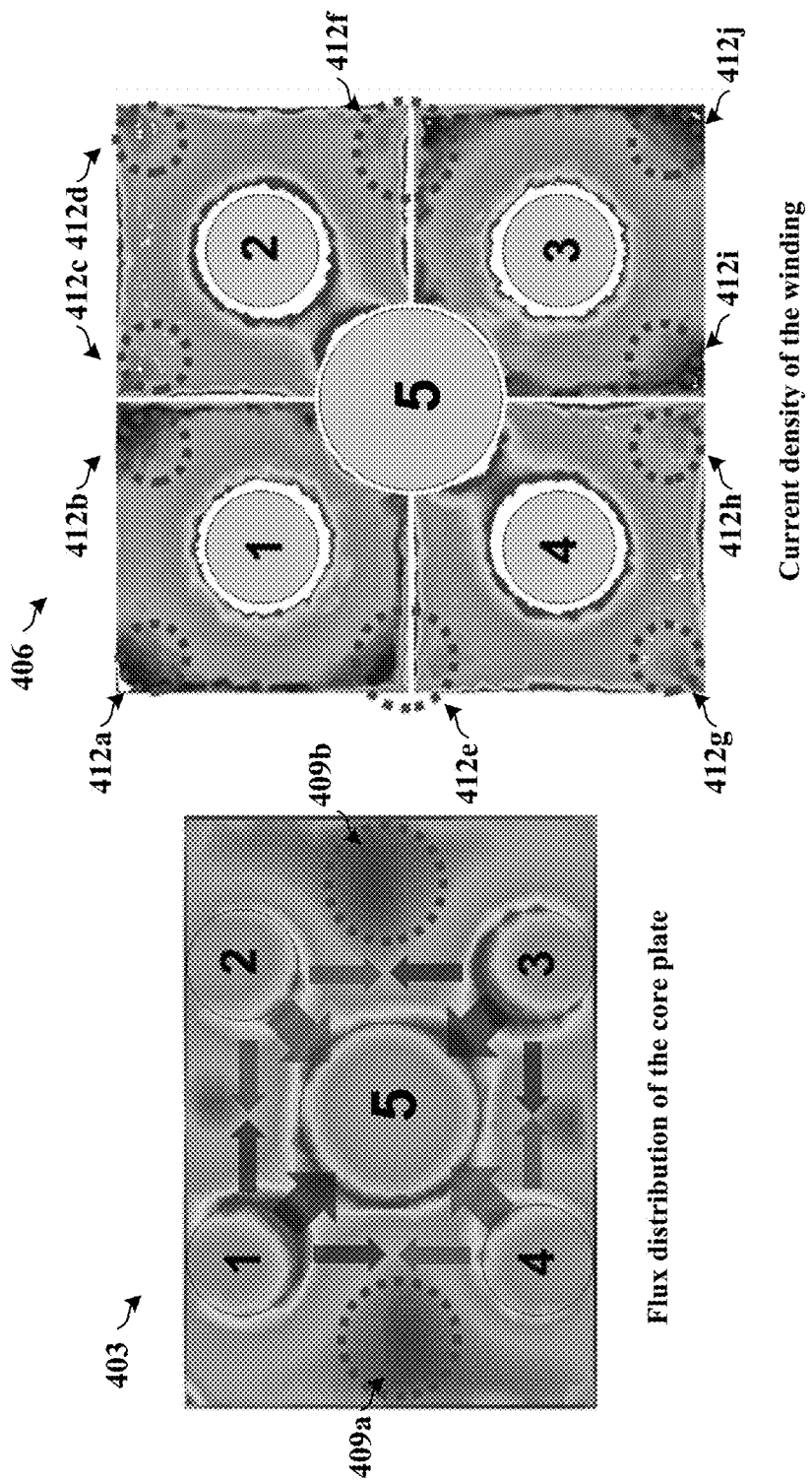
FIG. 4 illustrates an example graph of flux distribution and current density for the DC-DC converter with integrated matrix transformer and multiphase current doubler rectifier, according to embodiments of the present disclosure.

FIG. 4 shows a flux distribution graph 403 and a current density graph 406 for a shared center flux leg core topology. In the flux distribution graph 403, the marked darker areas 409*a* and 409*b* reveal underutilized space with low flux distribution compared to other areas of the core. In the current density graph 406, the marked darker areas 412*a*-412*j* reveal underutilized space with low current density compared to other areas of the core. As a result, the large center leg 5 can be separated or augmented to provide multiple flux paths through those areas and maximize performance.

Figure 5A:
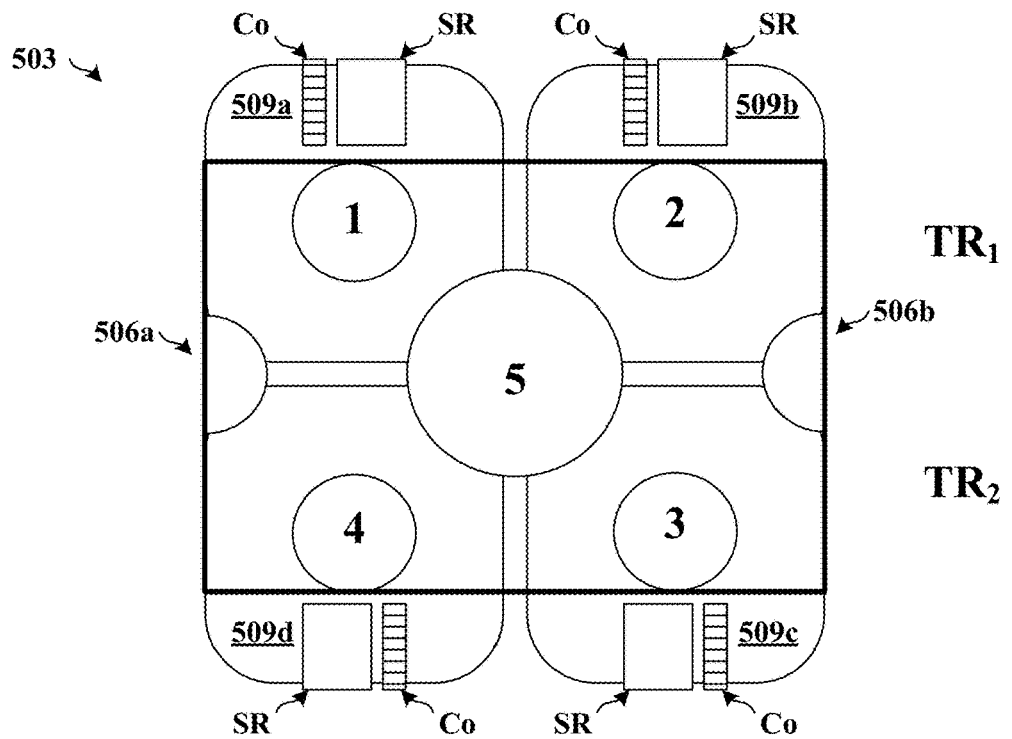
FIGS. 5A and 5B illustrate example core topologies for a DC-DC converter with integrated matrix transformer and multiphase current doubler rectifier, according to embodiments of the present disclosure.

FIG. 5A shows an example core topology 503 for a DC-DC converter 103. The core topology 503 can be similar to the core topology 303 of FIG. 3, except that the core topology 503 includes inter-transformer edge flux paths including inter-transformer edge flux path 506*a* and inter-transformer edge 506*b* (collectively, the inter-transformer edge flux paths 506) on a centerline between transformer components $TR_1$ and $TR_2$. The core topology 503 can be extended to include additional transformer components as well as multiple sets of inter-transformer edge flux paths. The center flux path 5 can be considered an inter-transformer center flux path. The inter-transformer flux paths can be aligned with the centerlines between or otherwise between neighboring transformer components.

The core topology 503 can also include one or more of the synchronous rectifiers and output capacitors $C_o$ integrated into the winding areas 509*a*-509*d*. Integrating the synchronous rectifiers and output capacitors $C_o$ into the winding area can reduce termination loss, reduce the current path length, and reduce the overall circuit footprint for the DC-DC converter 103. The thicker bold line shows the border of the magnetic core.

The cross sectional area of the center flux path 5 and the inter-transformer edge flux paths 506 can be chosen based on the flux requirements. As a result, the addition of inter-transformer edge flux paths 506 can allow the cross sectional area of the center flux path 5 to be reduced relative to the core topology 303. The center flux path 5 can also be considered separated into three parts that include the inter-transformer edge flux paths 506 and the smaller version of the center flux path 5. This topology can normalize flux density and current density in the core. Since the center flux path 5 can be reduced in size, the use of edge flux paths 506 can increase space for windings and reduce the overall footprint of the magnetic core and the DC-DC converter 103 circuit as a whole.

The core topology 503 can include transformer components $TR_1$ and $TR_2$. While not shown this can be extended to include any number of transformer components. The transformer $TR_1$ can include a split primary winding that is split between winding legs 1 and 2. One of the partial primary windings for $TR_1$ can be wound on winding leg 1 of a matrix transformer core along with a secondary winding of $TR_1$. The other partial primary winding can be wound on winding leg 2 of the matrix transformer core with another secondary winding of $TR_1$. The winding directions of the two partial primary windings can be opposite from each other.

Likewise, one of the partial primary windings for $TR_2$ can be wound on winding leg 3 of a matrix transformer core along with a secondary winding of $TR_2$. The other partial primary winding can be wound on winding leg 4 of the matrix transformer core with another secondary winding of $TR_2$. The winding directions of the two partial primary windings can be opposite from each other. The winding legs 1-4 can lack or include an air gap, while one or more of the shared center flux path leg 5 and the inter-transformer edge flux paths 506 can include a gap.

Figure 5B:
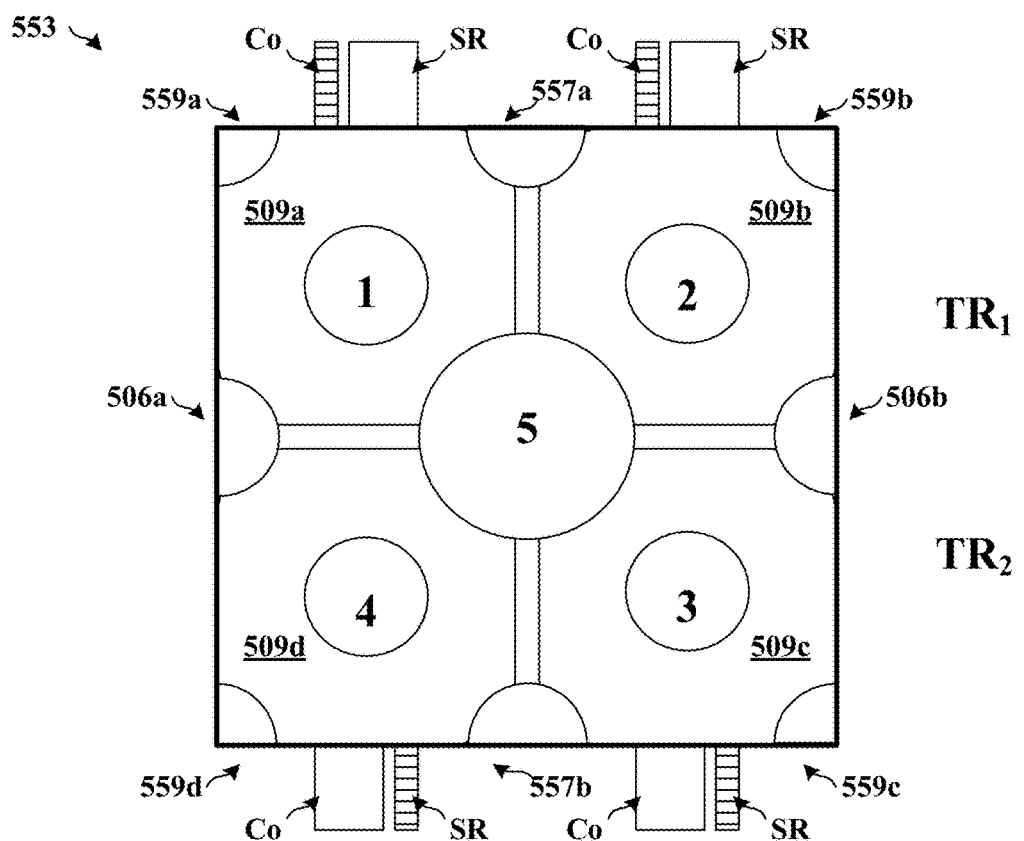

FIG. 5B shows an example core topology 553 for a DC-DC converter 103. The core topology 553 can be similar to the core topology 503 of FIG. 5A, except that the core topology 553 includes intra-transformer edge flux paths 557a and 557b (collectively, the intra-transformer edge flux paths 557) on a centerline between the legs of the split-primary transformer components TR₁ and TR₂, as well as corner flux paths 559a-559d (collectively, the corner flux paths 559) at the corner edges of the magnetic core. The core topology 553 can also include the inter-transformer edge flux paths 506a and 506b on centerlines between transformer components. The core topology 553 can further distribute and normalize flux density and current density. However, since the magnetic core edge extends to the edge of the winding areas 509a-509d in all directions, the synchronous rectifiers and output capacitors $C_o$ are not integrated into the winding areas 509a-509d.

The core topology 553 can include transformer components TR₁ and TR₂. While not shown this can be extended to include any number of transformer components. The transformer TR₁ can include a split primary winding that is split between winding legs 1 and 2. One of the partial primary windings for TR₁ can be wound on winding leg 1 of a matrix transformer core along with a secondary winding of TR₁. The other partial primary winding can be wound on winding leg 2 of the matrix transformer core with another secondary winding of TR₁. The winding directions of the two partial primary windings can be opposite from each other.

Likewise, one of the partial primary windings for TR₂ can be wound on winding leg 3 of a matrix transformer core along with a secondary winding of TR₂. The other partial primary winding can be wound on winding leg 4 of the matrix transformer core with another secondary winding of TR₂. The winding directions of the two partial primary windings can be opposite from each other. The winding legs 1-4 can lack or include a gap, while one or more of the shared center flux path leg 5, the inter-transformer edge flux paths 506, the intra-transformer edge flux paths 557, and the corner flux paths 559 can include a gap.

Figure 6A:
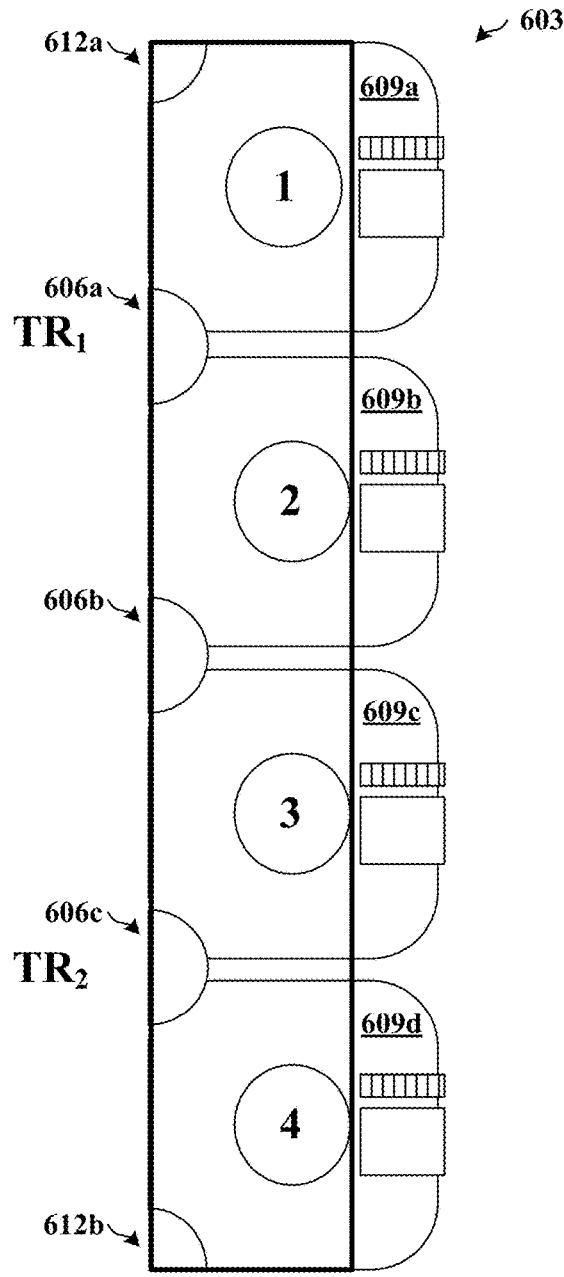
FIGS. 6A and 6B illustrate example core topologies for a DC-DC converter with integrated matrix transformer and multiphase current doubler rectifier, according to embodiments of the present disclosure.

FIG. 6A shows an example core topology 603 for a DC-DC converter 103. The core topology 603 can include transformer components TR₁, TR₂, and so on, aligned in a single line. The single-sided design with edge flux paths 606a-606c on a single side of the structure can enable the core topology 603 to include one or more of the synchronous rectifiers and output capacitors $C_o$ integrated into the winding areas 609a-609d. The core topology 603 can include edge flux paths 606a-606c (collectively, the edge flux paths 606). The edge flux paths 606 can include inter-transformer edge flux path 606b as well as intra-transformer edge flux paths 606a and 606c. The core topology 603 can further include corner flux paths 612a and 612b. All of the flux paths can be on a single side of the core structure. Integrating the synchronous rectifiers and output capacitors $C_o$ into the winding areas 609a-609d can reduce termination loss, reduce the current path length, and reduce the overall circuit footprint. The thicker bold line shows the border of the magnetic core. The core topology 603 can include transformer components TR₁ and TR₂. While not shown this can be extended to include any number of transformer components. The transformer TR₁ can include a split primary winding that is split between winding legs 1 and 2. One of the partial primary windings for TR₁ can be wound on winding leg 1 of a matrix transformer core along with a secondary winding of TR₁. The other partial primary winding can be wound on winding leg 2 of the matrix transformer core with another secondary winding of TR₁. The winding directions of the two partial primary windings can be opposite from each other.

Likewise, one of the partial primary windings for TR₂ can be wound on winding leg 3 of a matrix transformer core along with a secondary winding of TR₂. The other partial primary winding can be wound on winding leg 4 of the matrix transformer core with another secondary winding of TR₂. The winding directions of the two partial primary windings can be opposite from each other. The winding legs 1-4 can lack or include a gap. One or more of the flux path legs, such as the edge flux paths 606a-606c and corner flux paths 612a and 612b, can include a gap.

Figure 6B:
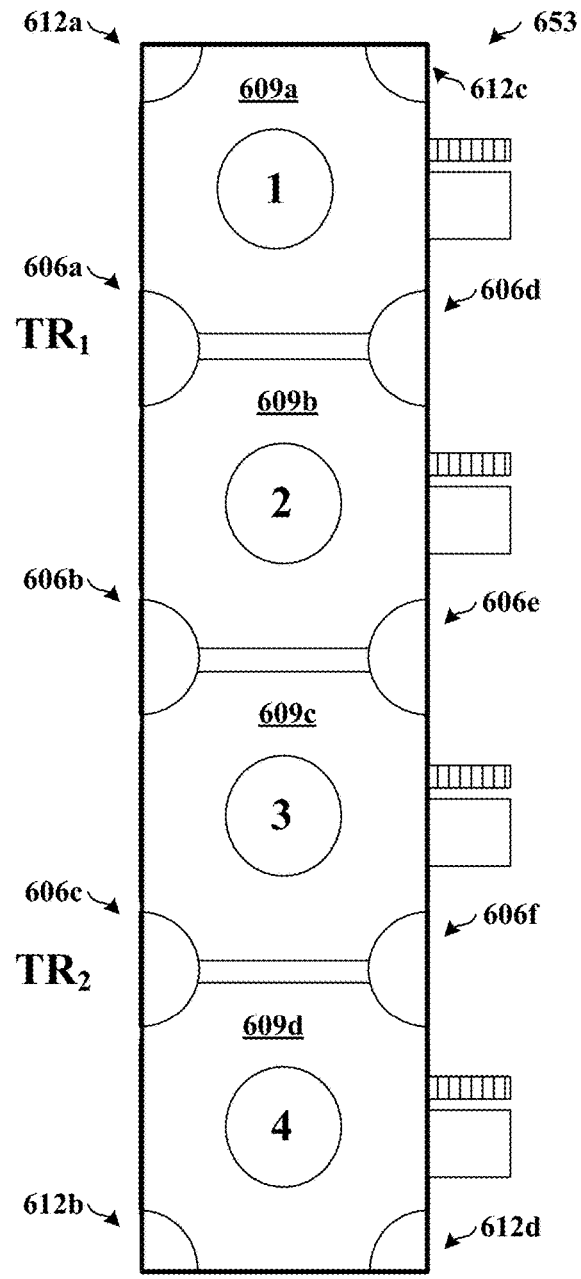

FIG. 6B shows an example core topology 653 for a DC-DC converter 103. The core topology 653 can include transformer components TR₁, TR₂, and so on, aligned in a single line. The core topology 603 can include edge flux paths 606a-606f (collectively, the edge flux paths 606). The edge flux paths 606 can include the inter-transformer edge flux path 606b on one side of the structure and the inter-transformer edge flux path 606e on an opposite side of the core structure. The core topology 603 can also include intra-transformer edge flux paths 606a and 606c on one side of the structure, along with intra-transformer edge flux paths 606d and 606f on another side. The symmetrical design can distribute and normalize flux density and current density relative to the core topology 603 of FIG. 6A.

The core topology 653 can include transformer components TR₁ and TR₂. While not shown this can be extended to include any number of transformer components. The transformer TR₁ can include a split primary winding that is split between winding legs 1 and 2. One of the partial primary windings for TR₁ can be wound on winding leg 1 of a matrix transformer core along with a secondary winding of TR₁. The other partial primary winding can be wound on winding leg 2 of the matrix transformer core with another secondary winding of TR₁. The winding directions of the two partial primary windings can be opposite from each other.

Likewise, one of the partial primary windings for TR₂ can be wound on winding leg 3 of a matrix transformer core along with a secondary winding of TR₂. The other partial primary winding can be wound on winding leg 4 of the matrix transformer core with another secondary winding of TR₂. The winding directions of the two partial primary windings can be opposite from each other. The winding legs 1-4 can lack or include a gap. One or more of the flux path legs, such as the edge flux paths 606 and corner flux paths 612, can include a gap.

Figure 7:
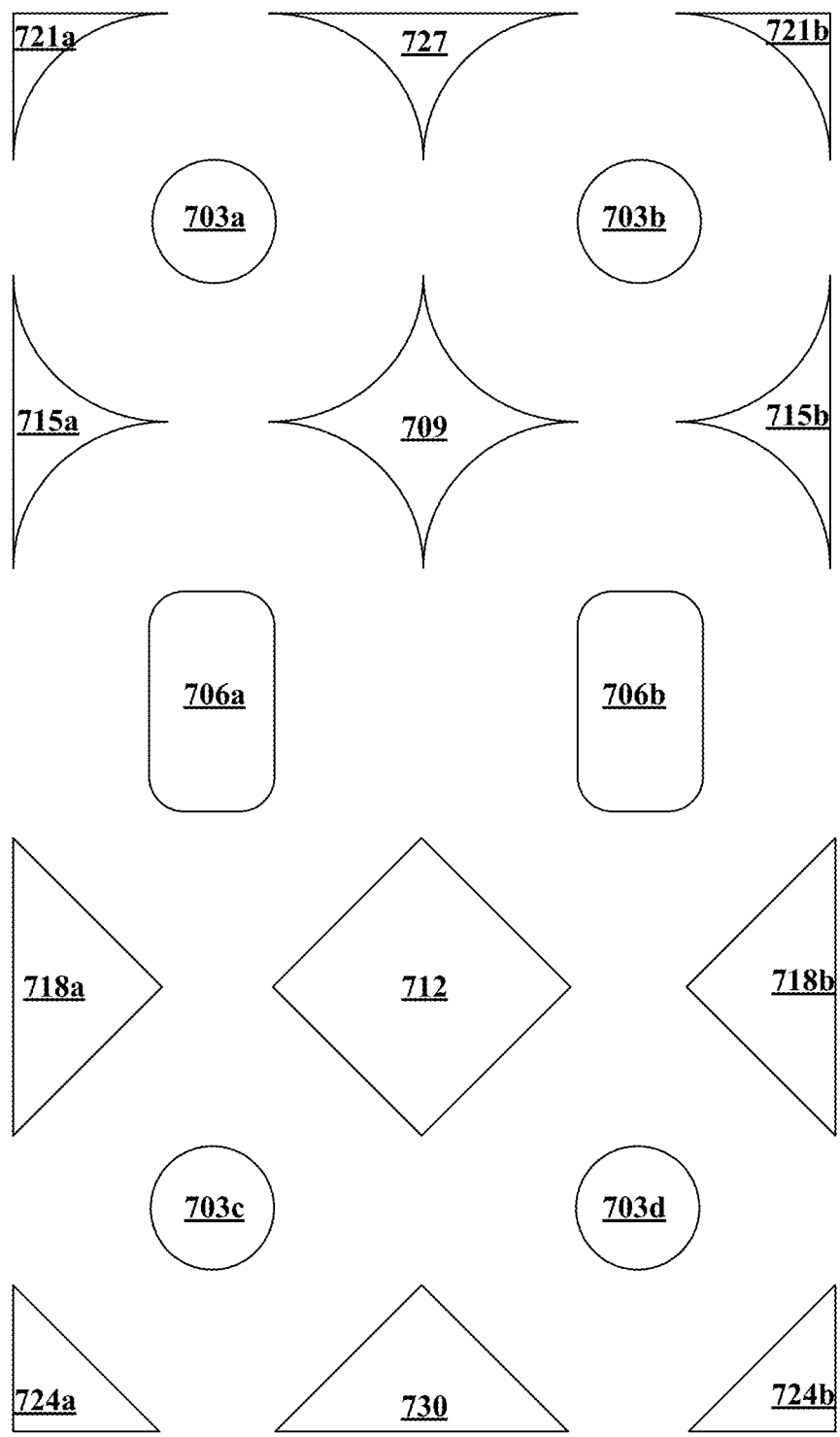
FIG. 7 illustrates example core leg shapes for a core of a DC-DC converter with integrated matrix transformer and multiphase current doubler rectifier, according to embodiments of the present disclosure.

FIG. 7 shows various cross-sectional core leg shapes for a magnetic core of a DC-DC converter 103. The core leg shapes include winding leg shapes 703a-703d (collectively, the winding leg shapes 703); winding leg shapes 706a-706b (collectively, the winding leg shapes 706); shared center flux path shapes 709 and 712; edge flux path shapes 715a and 715b (collectively, the edge flux path shapes 715); edge flux path shapes 718a and 718b (collectively, the edge flux path shapes 718); corner flux path shapes 721a and 721b (collectively, the corner flux path shapes 721), as well as corner flux path shapes 724a and 724b (collectively, the corner flux path shapes 724). Any of the winding leg shapes can be used with any of the shared center flux path shapes, edge flux path shapes, and corner flux path shapes shown in the various figures.

Each of the winding leg shapes 703 can include a circular cross section. Each of the winding leg shapes 706 can include a rounded-corner rectangular shape. Each of the winding leg shapes 706 can be selected based on design parameters and spacing of the overall circuit. Generally, the corners of the winding leg shapes can be rounded so that the windings can be wrapped closely to the winding leg to increase efficiency.

The shared center flux path shape 709 can be described as having an inverted scalloped shape with concave edges facing each winding leg. Other figures have shown a circular shared center flux path shape. Compared with the circular shape, the inverted scalloped shape can provide closer fitment to the windings around a winding leg.

The shared center flux path shape 712 can be described as having a diamond shape with a flat edge facing each winding leg. Compared with the circular shape, the diamond shape can provide closer fitment to the windings around a winding leg, but less than the inverted scalloped shape. However, the diamond shape can be easier to produce.

The inter-transformer edge flux path shapes 715 can be described as having inverted scallop or concave edges facing each winding leg and a flat back edge along the edge of the magnetic core. Compared with a semicircular shape shown in other figures, the inter-transformer edge flux path shapes 715 can provide closer fitment to the windings around a winding leg.

The inter-transformer edge flux path shapes 718 can be described as having a triangular or half-diamond shape with a flat edge facing each winding leg. Compared with a semicircular shape, the triangular shape can provide closer fitment to the windings around a winding leg, but less than the inverted scalloped shape. However, the flat edges of the triangular shape can be easier to produce.

The corner flux path shapes 721 can be described as having inverted scallop or concave edges facing each winding leg and squared or orthogonal flat back edges matching a corner of the magnetic core. Compared with the quarter-circle shape of other figures, the corner flux path shapes 721 can provide closer fitment to the windings around a winding leg.

The corner flux path shapes 724 can be described a triangular or quarter-diamond shape with one edge facing a winding leg and two squared or orthogonal flat back edges matching a corner of the magnetic core. Compared with the quarter-circle shape of the other figures, the corner flux path shapes 724 can provide closer fitment to the windings around a winding leg but less than the corner flux path shapes 721.

The intra-transformer edge flux path shape 727 can be described as having inverted scallop or concave edges facing each winding leg and a flat back edge along the edge of the magnetic core. Compared with a semicircular shape shown in other figures, the intra-transformer edge flux path shape 727 can provide closer fitment to the windings around a winding leg.

The intra-transformer edge flux path shape 730 can be described as having a triangular or half-diamond shape with a flat edge facing each winding leg. Compared with a semicircular shape, the triangular shape can provide closer fitment to the windings around a winding leg, but less than the inverted scalloped shape. However, the flat edges of the triangular shape can be easier to produce.

A controller can generate switching controls for the various switches of the DC-DC converters 103 according to computer-readable or program instructions. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Also, any functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or another type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A direct current (DC)-DC converter comprising:
a pulse width modulation (PWM) inverter that generates an alternating current (AC) voltage;
a matrix transformer comprising a plurality of transformer components, wherein:
a transformer component among the plurality of transformer components comprises a split primary winding and a plurality of secondary windings, and the split primary winding comprises a first partial primary winding wound on a first winding leg of the transformer component with a first secondary winding, and a second partial primary winding wound on a second winding leg of the transformer component with a second secondary winding; and
a multiphase current doubler rectifier comprising a plurality of synchronous rectifiers corresponding to the plurality of transformer components of the matrix transformer.

2. The DC-DC converter of claim 1, wherein a plurality of split primary windings corresponding to the plurality of transformer components are connected in parallel across the AC voltage generated by the PWM inverter.

3. The DC-DC converter of claim 1, wherein a plurality of split primary windings corresponding to the plurality of transformer components are connected in series across AC output nodes of the PWM inverter.

4. The DC-DC converter of claim 1, wherein the plurality of transformer components are magnetically integrated using a shared top plate and a shared bottom plate.

5. The DC-DC converter of claim 1, wherein the plurality of transformer components are aligned transformer components, wherein all winding legs of the plurality of transformer components are aligned in a single line.

6. The DC-DC converter of claim 1, wherein the plurality of transformer components are parallel transformer components, wherein the first winding leg and the second winding leg of the transformer component are aligned parallel with winding legs of other transformer components.

7. The DC-DC converter of claim 1, wherein the matrix transformer comprises a shared center flux path leg that is located between parallel transformer components of the matrix transformer.

8. The DC-DC converter of claim 1, wherein the matrix transformer comprises at least one edge flux path leg that is located between parallel transformer components of the matrix transformer.

9. The DC-DC converter of claim 1, wherein the matrix transformer comprises at least one corner flux path leg for at least one corner of the matrix transformer.

10. A matrix transformer for a direct current (DC)-DC converter, the matrix transformer comprising:
a plurality of magnetically integrated transformer components comprising a transformer component that shares a top plate and a bottom plate with at least one additional transformer component of the matrix transformer;
a split primary winding comprising: a first partial primary winding wound on a first winding leg of the transformer component, and a second partial primary winding wound on a second winding leg of the transformer component;
a first secondary winding that is wound on the first winding leg with the first partial primary winding; and
a second secondary winding that is wound on the second winding leg with the second partial primary winding, wherein the first secondary winding and the second secondary winding are connected to a synchronous rectifiers of a multiphase current doubler rectifier comprising a plurality of synchronous rectifiers corresponding to the plurality of magnetically integrated transformer components.

11. The matrix transformer of claim 10, wherein the plurality of synchronous rectifiers are connected in parallel.

12. The matrix transformer of claim 10, further comprising:
a plurality of split primary windings comprising the split primary winding, wherein the plurality of split primary windings are connected in parallel across an alternating current (AC) voltage of an inverter circuit.

13. The matrix transformer of claim 10, further comprising:
a plurality of split primary windings comprising the split primary winding, wherein the plurality of split primary windings are connected in series across an alternating current (AC) voltage of an inverter circuit.

14. The matrix transformer of claim 10, wherein the matrix transformer comprises a shared center flux path leg that is located between and shared by parallel transformer components of the matrix transformer.

15. The matrix transformer of claim 14, wherein the shared center flux path leg comprises at least one of: a diamond shaped cross section with a plurality of flat edges facing a plurality of winding legs of the parallel transformer components, and an inverted scallop shaped cross section with a plurality of curved edges concave to the plurality of winding legs.

16. The matrix transformer of claim 10, wherein the matrix transformer comprises at least one edge flux path leg that is located at an edge of the matrix transformer.

17. The matrix transformer of claim 10, wherein the at least one edge flux path leg comprises at least one of:
a triangular shaped cross section with two edges facing corresponding winding legs and one edge along an edge of the matrix transformer, and
a cross section comprising a plurality of curved edges concave to the corresponding winding legs.

18. A direct current (DC)-DC converter comprising:
a pulse width modulation (PWM) inverter that generates an alternating current (AC) voltage;
a matrix transformer comprising a plurality of magnetically integrated transformer components comprising a transformer component that shares a top plate and a bottom plate with at least one additional transformer component of the matrix transformer; and
a multiphase current doubler rectifier comprising a plurality of synchronous rectifiers corresponding to the plurality of magnetically integrated transformer components of the matrix transformer.

19. The DC-DC converter of claim 18, wherein a respective one of the synchronous rectifiers is integrated into a corresponding winding area around a winding leg of the matrix transformer.

20. The DC-DC converter of claim 18, wherein the matrix transformer comprises a center flux path leg and a plurality of edge flux path legs between parallel transformer components.

* * * * *